R. DODGE.
SNOW PLOW.
APPLICATION FILED OCT. 26, 1914.
1,151,091.
Patented Aug. 24, 1915.
3 SHEETS—SHEET 1.
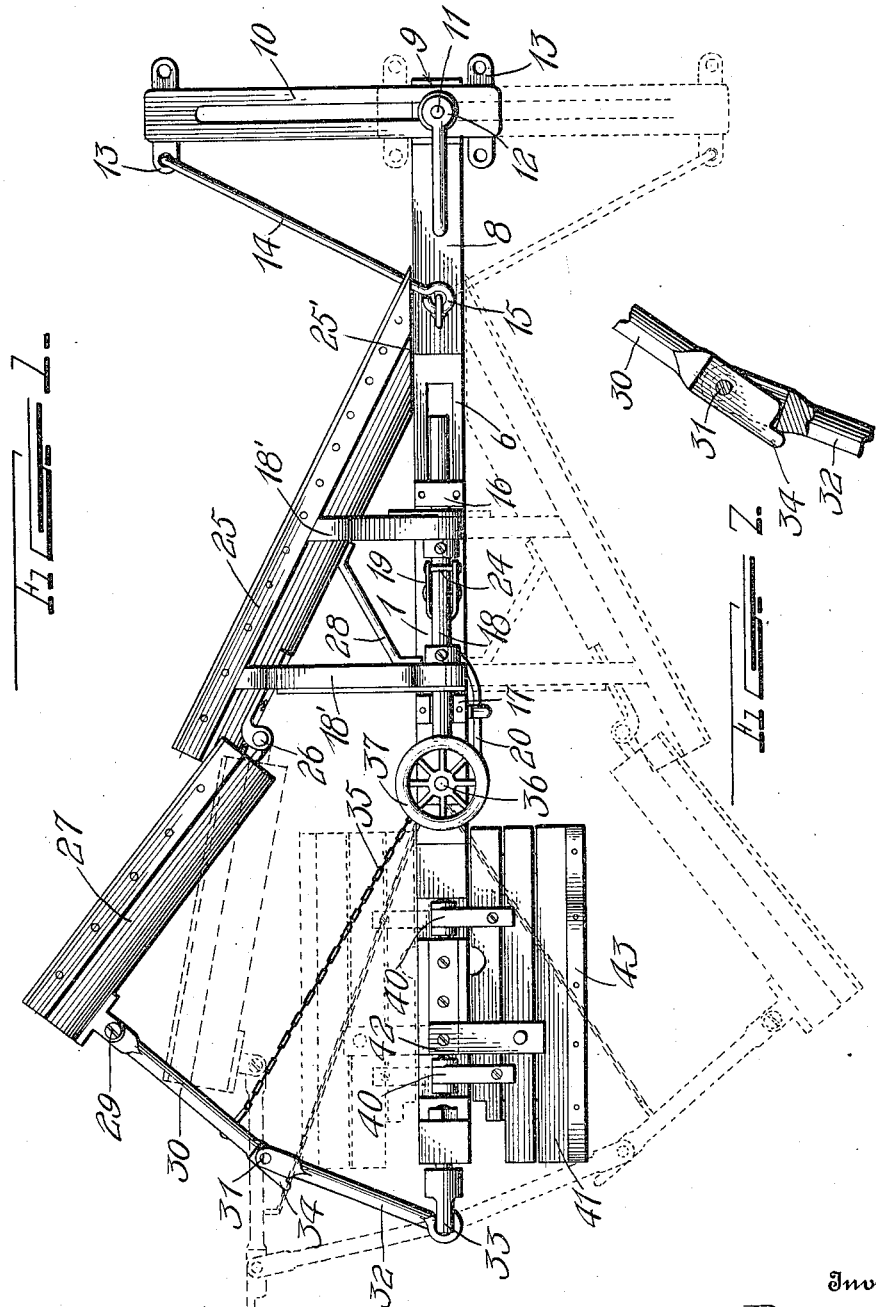
Inventor
Ralph Dodge.
Witnesses
By 
Attorneys

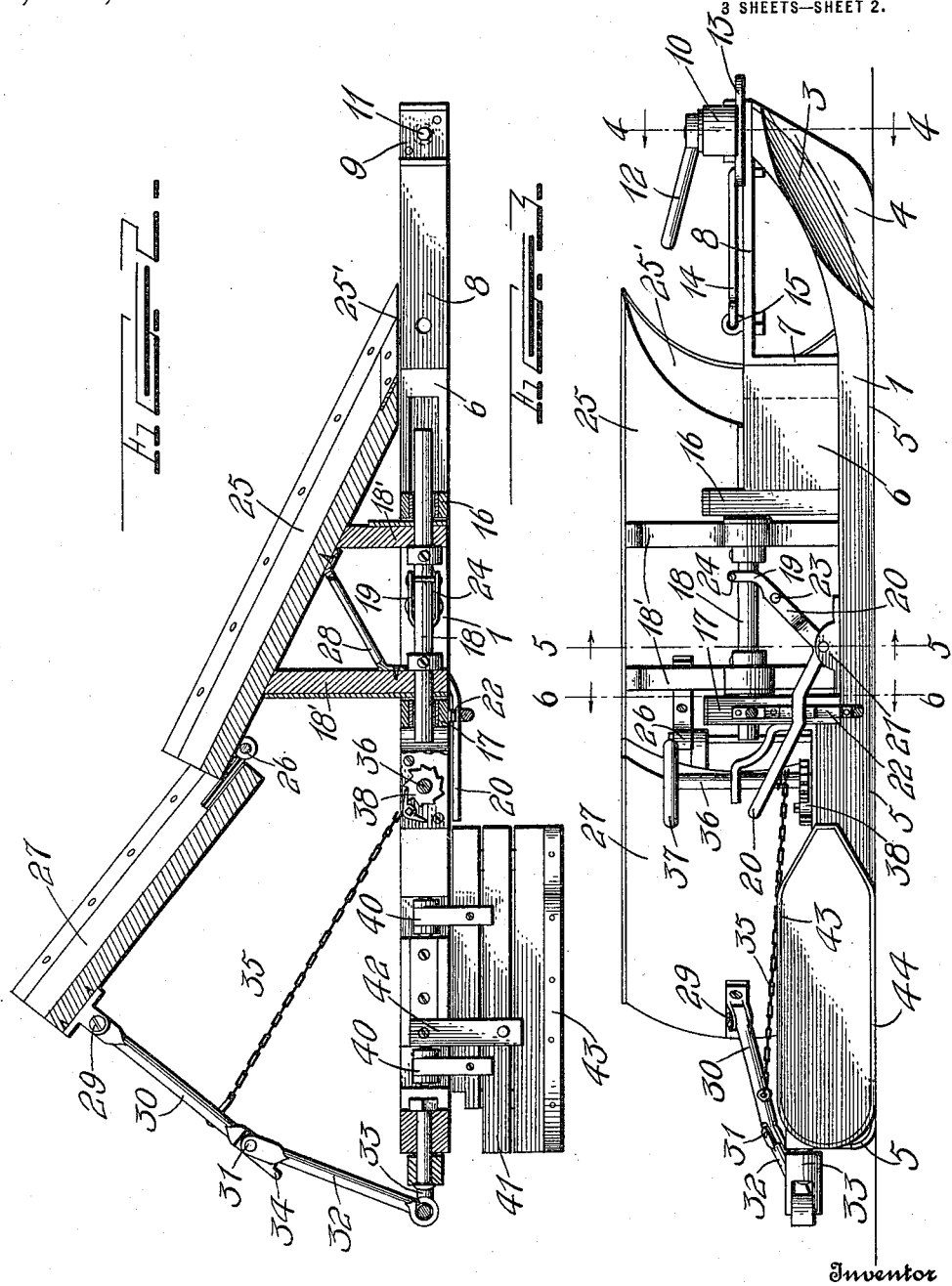

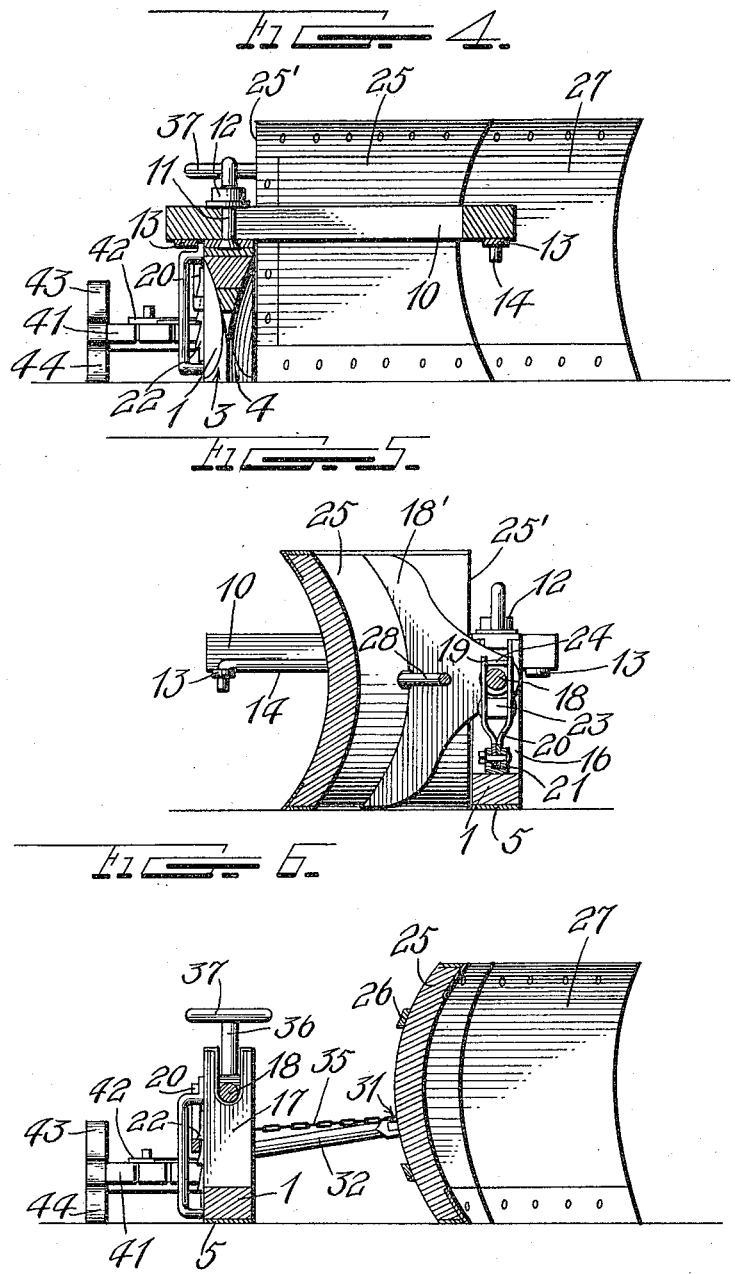

UNITED STATES PATENT OFFICE.

RALPH DODGE, OF CENTER HARBOR, NEW HAMPSHIRE.

SNOW-PLOW.

1,151,091.

Specification of Letters Patent. Patented Aug. 24, 1915.

Application filed October 26, 1914. Serial No. 868,700.

*To all whom it may concern:*

Be it known that I, RALPH DODGE, a citizen of the United States, residing at Center Harbor, in the county of Belknap and State of New Hampshire, have invented certain new and useful Improvements in Snow-Plows; and I do declare the following to be a full, clear, and exact description of the invention, such as will enable others skilled in the art to which it appertains to make and use the same.

My invention relates to improvements in snow plows and has for its object to improve upon the construction of devices of this character to such an extent as to provide an extremely simple device yet one possessing a number of advantageous features.

To the above end, the invention aims to provide novel means whereby the device may be constructed with but a single supporting runner, to render the mold board readily adjustable and reversible and to likewise provide a reversible draw bar.

With the above and minor objects in view the invention resides in certain novel features of construction and combination herein described and claimed and shown in the drawings wherein:

Figure 1 is a top plan view of a snow plow constructed in accordance with my invention, showing in full and dotted lines the two positions of the mold board and parts coacting therewith; Fig. 2 is a similar view with parts removed and in horizontal section; Fig. 3 is a side view; Figs. 4, 5 and 6 are vertical transverse sections as seen on the lines 4—4, 5—5 and 6—6 of Fig. 3, and, Fig. 7 is a detail horizontal section showing the meeting ends of a pair of toggle links to be described.

In the accompanying drawings, forming a part of this application, the numeral 1 designates a longitudinal supporting runner whose forward end is curved upwardly and beveled at 3 to provide a comparatively sharp cutting edge, and provided with a cutting blade 4 from which a wear plate 5 projects rearwardly and is secured to the under side of the runner. Rising from the front end portion of the runner 1, is a vertically slotted block 6 to whose forward end the upright arm 7 of an inverted L-shaped bracket 8 is secured, the horizontal arm of said bracket being secured to the upturned end of the runner 1 and being provided with a transverse guide-way 9 in which a transverse slotted draw bar 10 is located, a bolt 11 rising from said guide-way through the slot in the draw bar and receiving a lever operated nut 12 on its upper end. This draw bar 10 is provided, at its four corners, with apertured ears or eyes 13 with the rearmost of which, the downturned end of a bracing hook 14 is designed to be engaged, while the eyes at the front of the bar are provided for the attachment of draft mechanism (not shown).

By reference more particularly to Fig. 1, it will be seen that the rod 14 extends obliquely inward and rearward from one of the eyes 13 and is pivoted at 15 to the horizontal arm of the bracket 8, this positioning of parts being clearly seen in full lines in said figure, and being employed when a mold board, to be described, is thrown to one side of the runner, while the draw bar 10 and its brace 14 may be moved to the dotted line position, when said mold board is swung to the opposite side of the runner.

Rising from the intermediate portion of the runner 1, is a front upright guide 16 and a similar rear guide 17, both of said guides being provided with upright slots within which a longitudinal horizontal shaft 18 is mounted for rotary and vertical movement, the portion of said shaft between the two guides being embraced by the fork 19 of a bell crank lever 20 which is pivoted to a bracket 21 secured to the runner 1, said fork being carried by one arm of the bell crank while the opposite arm thereof, which arm is resilient, projects rearwardly into yieldably contact with an upright rack bar 22 which is secured to one side of the guide 17. The fork 19 carries an anti-friction roller 23 below the shaft 18 and a stop pin 24 above said shaft, whereby depression of the rear arm of the bell crank will cause the anti-friction roller 23 to contact with the under side of the shaft 18 thereby raising said shaft. Said rear arm will then spring into engagement with the teeth on the rack 22 thereby locking the shaft in its raised position. Secured to and projecting laterally from the shaft 18, is a pair of brackets 18′ to whose upper ends an oblique mold board 25 is secured, the front end of said mold board being beveled as seen at 25′ whereby it may snugly engage the adjacent side of the block 6, while its rear end is provided with a pair of hinges 26 which connect a laterally adjustable supplemental mold board 27 to said mold board 25. As seen in the various figures of the drawings, both mold boards 25 and 27 are crescent shaped in cross section. If desired, the rearmost bracket 18' may be braced in respect to the mold board 25 by a rod 28 as seen in Figs. 1, 2 and 5.

Pivotally connected at 29 with the rear end of the laterally adjustable mold board 27, is the outer end of a toggle link 30 whose inner end is pivoted at 31 to a second toggle link 32, whose inner end is swiveled, at 33, to the rear end of the runner 1. By reference more particularly to Figs. 1 and 7, it will be seen that the outer end of the link 32 is forked to receive the inner end of the link 30, and that said last mentioned link is provided with a stop 34 which contacts with the link 32, when both of said links stand at the limit of their forward movement, in which position the pivot 31 is prevented from alining with the pivots 29 and 33 or, in other words, the toggle links are prevented from approaching dead center, this being expedient since a flexible operating element 35 is provided for moving the inner ends of said links forwardly. The operating element 35 extends forwardly from the toggle links and is wound upon an upright shaft 36, whose lower end is revolubly mounted in a suitable bearing on the runner 1, said shaft being provided with a hand wheel 37 and with a dog and ratchet mechanism 38 whereby it may be locked against movement. By thus connecting the supplemental mold board 27 with the runner 1, it will be seen that when the machine is employed for conveying snow and ice laterally, inward pressure will be exerted upon said supplemental mold board, this pressure being overcome by the flexible element 35 which retains the toggle links in proper position as is seen in Figs. 1 and 7. When, however, the dog is released to allow the shaft 36 to rotate in a direction to unwind the element 35, the inward pressure upon the mold board 27 will move the same to the position seen in dotted lines at the upper left hand corner of Fig. 1. When it again becomes necessary to force the mold board 27 outwardly, it will be understood that the shaft 36 is rotated by the hand wheel 37 to rewind the element 35.

Projecting laterally from the rear end portion of the runner 1 and hinged thereto at 40, is a horizontal platform 41 upon which the driver of the plow may stand, said platform being capable of being swung to the position seen in full lines in Fig. 1 or to that seen in dotted lines in said figure, in either of which positions it is retained by a plate 42 which is pivoted to the top of the runner 1 and which may be swung laterally over said platform as clearly seen in Figs. 1, 2, 4 and 6. The outer edge of the platform 41 carries a double runner or, in other words, a runner 43 rising from said outer edge while a similar runner 44 depends therefrom, it being expedient to provide two runners in order that the outer edge of the platform may be supported when the latter is swung to either side of the machine. It may here be explained that the provision of the plow 41 and its runners 43 and 44 assist in preventing tipping or tilting of the plow, as well as constituting a support upon which the operator may stand.

When it is desired to direct snow and ice to the left, all parts are positioned as seen in full lines in Fig. 1, the supplemental mold board 27 being now adjusted to the necessary extent, according to the width of the street or sidewalk being cleaned. When, however, it is necessary to direct the snow in the opposite direction, the mold boards 25 and 27 are raised, during which movement the shaft 18 rotates within the guides, it being understood that said mold boards may now be swung to the position seen in dotted lines in Fig. 1, after which the necessary adjustments may be made. The locking plate 42 may now be swung inwardly thereby allowing the platform 41 to be swung in the opposite direction, after which said plate is again swung outwardly, and the draw bar is adjusted to the opposite side of the machine in the manner hereinbefore set forth.

From the foregoing description, taken in connection with the accompanying drawings, it will be seen that a comparatively simple plow has been provided yet one which possesses a number of advantageous features.

I claim:

1. A snow plow comprising a main runner, a mold board extending laterally from one side of said runner and shiftable to the other side thereof, and an additional and shorter runner spaced laterally from and lying parallel to the last named side of the main runner and shiftable to the opposite side thereof.

2. A snow plow comprising a main runner, a member hinged to and extending laterally from one side of said main runner but shiftable to the opposite side thereof, a second runner depending from the laterally extending member and disposed parallel to the main runner, a third runner rising from the aforesaid member and disposed parallel to the other runners, and a mold board spaced laterally from the side of the main runner remote from the second and third runners and shiftable to the other side thereof.

3. A snow plow comprising a single supporting runner, a reversible mold board connected thereto, a platform hinged to said runner and projecting laterally therefrom, means for locking said platform against movement, a second runner depending from said platform, and a third runner rising therefrom.

4. A snow plow comprising a supporting runner, a pair of longitudinally spaced upright guides rising therefrom, a longitudinal shaft mounted for vertical movement in said guides, a reversible mold board connected to said shaft, a bell crank having a fork straddling said shaft, stops carried by said fork on opposite sides of the shaft, and a rack for locking the bell crank against movement.

5. A snow plow comprising a single supporting runner, a block rising from the front portion thereof, a mold board projecting obliquely outward from the runner and having its front end beveled and contacting with said block, and connections between the mold board and the runner whereby the former may be swung to either side of the latter.

In testimony whereof I have hereunto set my hand in presence of two subscribing witnesses.

RALPH DODGE.

Witnesses:
BENJAMIN R. DOW,
ADA V. MORRILL.

Copies of this patent may be obtained for five cents each, by addressing the "Commissioner of Patents Washington, D. C."